United States Patent [19]

Murayama et al.

[11] 4,428,873
[45] Jan. 31, 1984

[54] ELECTROOPTICAL ELEMENT

[75] Inventors: Naohiro Murayama; Teruo Sakagami; Masuhiro Shoji, all of Iwaki, Japan

[73] Assignee: Kureha Kagaku Kogyo Kabushiki Kaisha, Tokyo, Japan

[21] Appl. No.: 297,016

[22] Filed: Aug. 27, 1981

[30] Foreign Application Priority Data

Aug. 30, 1980 [JP] Japan .................................. 55-120196
Sep. 22, 1980 [JP] Japan .................................. 55-131827

[51] Int. Cl.$^3$ ............................ G02F 1/07; G02F 1/03
[52] U.S. Cl. ..................................... 252/583; 350/355; 350/356
[58] Field of Search .................... 252/583, 408 LC; 350/355, 356, 96.34, 96.31, 96.13

[56] References Cited

U.S. PATENT DOCUMENTS

| | | | |
|---|---|---|---|
| 3,167,607 | 1/1965 | Marks | 252/299.01 |
| 3,257,903 | 6/1966 | Marks | 252/299.01 |
| 3,642,347 | 2/1972 | Lipp | 350/356 |
| 3,941,453 | 3/1976 | Kruger | 252/583 |
| 3,955,015 | 5/1976 | Ohtsuka et al. | 427/163 |
| 4,058,477 | 11/1977 | Boller et al. | 252/583 |
| 4,072,411 | 2/1978 | Frank et al. | 350/356 |
| 4,231,641 | 11/1980 | Randin | 350/357 |
| 4,234,437 | 11/1980 | Friberg et al. | 252/299.01 |
| 4,283,114 | 8/1981 | Wandrack | 350/356 |

FOREIGN PATENT DOCUMENTS 2214328 12/1972 Fed. Rep. of Germany ...... 350/355
1331228 9/1973 United Kingdom ................ 350/356

OTHER PUBLICATIONS

Kerr Effect in Substituted Aromatic Nitro Compounds, A. D. Pearson, W. R. Northover & E. A. Chandross; Journal of Applied Physics, vol. 41, No. 6, pp. 2576-2580.
Interdigital Electro-Optic Thin-Film Modulator, J. N. Polkey & J. H. Harris; Appl. Phys. Lett., vol. 21 No. 7, pp. 307-309.

Primary Examiner—Brooks H. Hunt
Assistant Examiner—Howard J. Locker
Attorney, Agent, or Firm—Woodcock, Washburn, Kurtz, Mackiewicz & Norris

[57] ABSTRACT

An electrooptical solid element comprises a formed resin composition comprising a low molecular polar substance having a Kerr type electrooptical effect, and an organic polymer substance compatible with the low molecular polar substance. The formed resin composition is prepared by a method such as melt mixing on rollers, or dissolution in a common solvent followed by evaporation of the solvent. This formed resin composition is prepared in various shapes such as a polygon, a film, a prism and a polygonal pole. At least a pair of electrodes are provided on the surfaces of the formed resin composition, and further at least one of the electrodes may can be made of a transparent material.

5 Claims, 10 Drawing Figures

DESCRIPTION OF THE PREFERRED EMBODIMENTS

Figure 1:
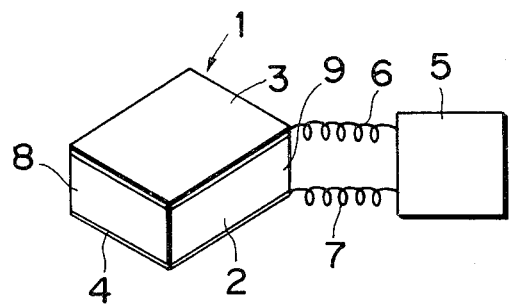
FIG. 1 is a perspective view of an electrooptical element according to a first embodiment of the present invention.

Prior to the description of the embodiments, the general concept of the present invention will be described as follows:

As a result of an extensive research, the present inventors have found out that a solid solution obtained by dispersing a low molecular polar substance having a Kerr type electrooptical effects, in a polymer material compatible therewith, such as a thermoplastic resin, has an extremely high electrooptical effect, and they have succeeded to obtain a useful electrooptical element with use of such a solid solution.

According to the study of the present inventors, there are many organic low molecular compounds having great electrooptical effects, other than nitrobenzene, and most of them are solid at normal temperature. However, crystals of organic compounds are generally inferior in their mechanical strength, and accordingly, it is relatively difficult to finish them in their solid state to have a smooth surface required for an optical element. For this reason, there has been no instance in which an organic substance which is solid at normal temperature is practically used as an electrooptical element, and there have been only a small number of cases where the electrooptical effects are measured.

However, cyclic compounds substituted by an electron attractive group such as a nitro group, a halogen group, an alkyl substituted sulfoxide group, or a sulfonic acid ester group, generally have a fairly great electrooptical effect (Kerr effect). If these cyclic compounds have, in addition to such an electron attractive group, an electron donative group such as an alkyl group, an amino group an aminoalkyl group, an azo group, a hydroxyl group, an alkoxy group or a cyano group, their polarity is greater and they are thus believed to have a greater electrooptical effect.

The present invention is concerned with a Kerr effect electrooptical element wherein a formed material of a resin composition comprising a low molecular polar substance having a Kerr effect electrooptical effect dispersed in a polymer substance compatible therewith, is used as the electrooptical material. For instance, the electrooptical element of the present invention comprises a formed body prepared by forming said resin composition in a form of a film or a polyhedron, and at least a pair of electrodes provided on the formed body to apply a voltage.

Polar substances which may be used in the present invention are not necessarily limited to organic compounds, but, for instance, nitro aromatic compounds such as nitrobenzene, nitrotoluene, nitronaphthalene, nitrotetraline, nitroaniline, nitrostyrene, nitrotoluidine, nitrophenol, nitrobenzylamine, diaminonitrobenzene, aminonitronaphthalene, chloronitroaniline, nitrodiphenylamine, and nitrocarbazole, nitro-substituted cyclic compounds such as nitropyridine, or acetophenone or benzyl alcohol derivatives, are preferred as they have a great Kerr effect and they have good compatibility with synthetic resins.

The low molecular substance is a term used relative to the polymer substance, and is intended to represent a substance having no or a small number of repeating polymerized units, and it includes single molecular compounds in most cases but it may further include substances which comprises a plurality of single molecules, such as complexes. There is no particular limitation in its molecules weight. However, the molecular weight may be less than 1000 in most cases, preferably from 100 to 500.

On the other hand, as the polymer substance to be used in the present invention, a transparent substance is preferred in view of the transmission of light. Further, the polymer substance is required to have good compatibility with a low molecular polar substance to be mixed therewith, since the electrooptical effect becomes greater as the proportion of the dispersed low molecular polar substance to the polymer substance increases.

The selection of the polymer substance must be made with care taking into account the compatibility with the low molecular polar substance to be mixed and dispersed. However, for instance, polymethacrylates such as acrylic acid ester and polymethylmethacrylates, and thermoplastic resins such as polystryrene, polysulfone, polyvinylchloride, polycarbonate, BS resin, ABS resin, and MBS resin are preferred. The polymer substances are preferably those which are completely transparent by themselves. However, even when they are not completely transparent, they may still be useful provided that they become transparent when plasticized by the low molecular polar substance.

The Kerr type electrooptical material of the present invention may be produced by a method per se conventionally known. For instance, it may be produced by uniformly melt mixing the polymer substance and the low molecular polar substance on a roller surface heated to a temperature higher than their melting points and lower than their decomposition temperature, as commonly used in a usual polymer blending. Alternatively, the polymer substance and the low molecular polar substance may be dissolved in a suitable solvent to

ELECTROOPTICAL ELEMENT

BACKGROUND OF THE INVENTION

1. Field of the Invention

The present invention relates to an electrooptical element such as a light modulation element having an electrooptical effect.

2. Description of the Prior Art

An electrooptical effect is such a phenomenon that when an electric field is applied to an optical medium, the refractive index of the medium changes. There are two types of the electrooptical effect, namely, a linear electrooptical effect (i.e. Pockels effect) and a secondary electrooptical effect (i.e. Kerr effect).

For instance, among known materials having the electrooptical effects, inorganic crystals having no center symmetry such as $KH_2PO_4$ (KDP), $NH_4H_2PO_4$ (ADP), $LiNbO_3$, and PLZT have both Pockels effect and Kerr effect. However, the Pockels effect is generally greater than the Kerr effect in these materials. On the other hand, inorganic substances having a center symmetry such as $Ba_2Na_2Nb_5O_{15}$, or fine crystal aggregates or liquids, such as ceramics having certain compositions such as PLZT, organic liquids such as nitrobenzene, acetophenone, benzyl alcohol, or carbon disulfide, and solutions prepared by dissolving polar substances such as nitrostyrene or nitroanisole into a solvent, have primarily the Kerr effect.

When these substances are used as electrooptical modulation elements, in the case of single crystal materials, the preparation of the crystals is difficult because it involves withdrawal of the crystals from an aqueous solution or from a molten solution at a high temperature. Further when the material has the Pockels effect, it is necessary to carry out electric field treatment at a temperature higher than the Curie point thereof and to divide the material into single units before use. However, while such an inorganic material has a superior hardness, it has a drawback that brittle and cracks are likely to form during or prior to or after the electric field treatment due to electric strain or temperature strain. Thus, there is a defect that it is hardly possible to obtain electrooptical material of high quality by mass production. Further, when it is subjected to electric field treatment, a piezo-electric property is imparted to the crystal. If it has a piezo-electric property, a vibration occurs when a voltage is repeatedly applied to between the electrodes, and especially when the frequency of the applied voltage coincides with the normal vibration of the element, retardation of transmission of light becomes abnormally great due to birefringence effect of stress, and thus, the property for a mudulator is thereby impaired. Further, a single crystal material has a birefringence property of the crystal itself. Therefore, it is necessary to provide a wave length plate in order to reduce the retardation of light transmission caused by the birefringence of the crystal itself. Hence there is a drawback that the optical system will inevitably become complicated.

It can be said not only with respect to a single crystal but also to ceramics such as PLZT, that an inorganic solid is generally hard and brittle and it is difficult to obtain an optically uniform solid having a large size. Accordingly, there is a drawback that the cost becomes high.

With respect to organic substances having electrooptical effects, conventional ones are either liquid by themselves or they are used in a form of a liquid, as dissolved in a suitable solvent. Accordingly, they are optically isotropic and thus has a merit that they have no birefringence when used as an electrooptical element. However, in a construction of a modulation element, they have to be sealed in a glass cell having a pair of parallel electrode plates sealed therein, and accordingly the element tends to have an extra thickness, which in turn limits the possibility of minimizing the element. Besides, there is an additional drawback that the glass cell and the electrodes are mechanically weak, and thus tend to lead to a degradation of the performance due to a deformation of breakage or to a total breakdown.

It will be considered possible to produce a superior electrooptical element having no such drawbacks as are inherent to the above mentioned known electrooptical materials made of inorganic substances or liquid organic substances, if there is available a readily formable material such as a thermoplastic resin having a high electrooptical effect. However, among known thermoplastic resins, there is not such a material which is known to have a good electrooptical effect and which is practically useful. It is known that piezoelectric films made of polymers or co-polymers composed mainly of vinyl fluoride or vinylidene fluoride exhibit great electrooptical effects. It is assumed, however, that the apparent great electrooptical effects are created by a change of the birefringence of the film having a stretch-orientation due to a strain of the film which is, in turn, created by an inverse piezo-electricity created upon application of a voltage to the film having a stretch-orientation. In fact, with a film or other formed material having no stretch-orientation and no great piezo-electricity, the electrooptical effects are extremely small. Further, the above mentioned piezo-electric films have a drawback that their electrooptical effect are very much affected by the temperature change.

OBJECTS AND SUMMARY OF THE INVENTION

Accordingly, one object of the present invention is to provide an electrooptical element which can readily be produced and which is suitable for mass production of products of uniform quality.

Another object of the present invention is to provide an electrooptical element which has a minimal retardation due to e.g. birefringence by stress, whereby it is unnecessary to insert a wave length plate to reduce the retardation.

A further object of the present invention is to provide an electrooptical element which can be formed into any desired shape and which can be made in a small size.

A still further object of the present invention is to provide an electrooptical element composed of a solid solution which does not require sealing in a glass cell.

A still further object of the present invention is to provide an electrooptical element which has an optically uniform property and which undergoes little change in its electrooptical effect by the influence of the temperature.

The above and other objects, features and advantages of the invention will be apparent from the following detailed description of illustrative embodiments which are to be read in connection with the accompanying drawings.

obtain a uniformly mixed and dispersed liquid, and the solvent is then evaporated from the liquid to obtain a solid. As such a solvent, there may be mentioned, for instance, acetone, methylethyl ketone, DMF, DMA, benzene, chloroform, carbon tetrachloride, or trichloroethylene. As a further method, it is possible to immerse a resin composition in the above mentioned low molecular polar substance or its solution thereby to diffuse and disperse the low molecular polar substance into the resin. In the case where the low molecular polar substance is diffused and dispersed into the resin composition, it is possible that the low molecular substance presents a concentration gradient in the composition, and in some cases, this concentration gradient is advantageously utilized to obtain a variation in the refractive index.

Now, the preferred embodiments of the present invention will be described with reference to the accompanying drawings.

FIG. 1 illustrates an electrooptical element 1 of a rectangular body according to the first embodiment, in which p-nitroaniline was used as the low molecular compound having an electrooptical characteristic and polymethylmethacrylate was used as the thermoplastic resin. An electrooptical resin layer 2 was composed of a resin composition melt formed by homogeneously mixing these materials in a weight ratio of 2:8 and finished by chemically polishing the surface. Electrodes 3 and 4 were attached to the opposite surfaces (surfaces of $5 \times 3$ mm$^2$) of the electrooptical resin layer 2 having a rectangular body shape of a size of 5 mm$\times$3 mm$\times$2 mm. Electric wires 6 and 7 extending from a power source 5 (direct or alternating current) were connected to the electrodes 3 and 4, respectively. This element 1 had a Kerr constant of $1.7 \times 10^{-10}$ cm/V$^2$ when one of the pair of opposite surfaces (for instance, surfaces 8 and 9 of $2 \times 3$ mm$^2$) on which no electrodes were provided, was used as a light entering surface and the other as a light outgoing surface.

Figure 2:
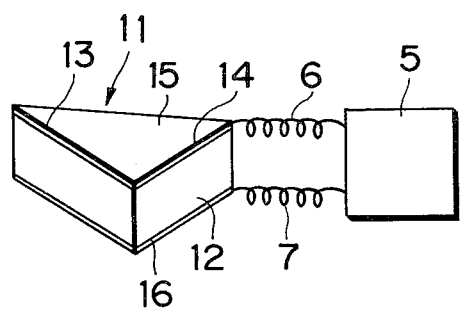
FIG. 2 is a perspective view of an electrooptical element according to a second embodiment of the present invention.

FIG. 2 illustrates an electrooptical element 11 having a shape of a prism according to the second embodiment, in which an electrooptical resin composition 12 is a right-angled prism shape having two crossing sides 13 and 14 or 5 mm and a thickness of 2 mm and electrodes 15 and 16 are attached to the opposite parallel two surfaces.

Figure 3:
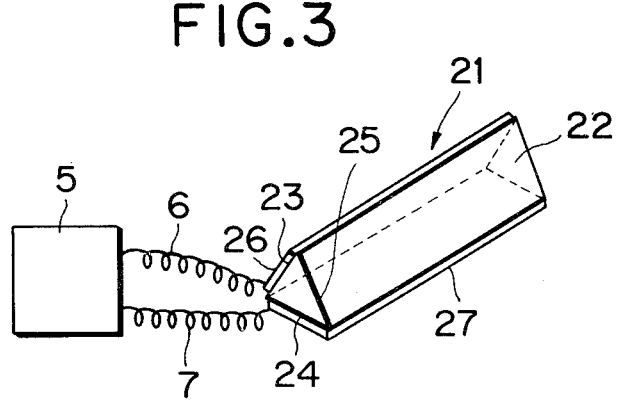
FIG. 3 is a perspective view of an electrooptical element according to a third embodiment of the present invention.

FIG. 3 illustrates an electrooptical element 21 having a shape of a regular triangular pole according to the third embodiment. The electrooptical composition 12 is a regular triangle pole shape having sides 23, 24 and 25 of 3 mm and an axial length of 10 mm. A pair of independent electrodes 26 and 27 are attached to the adjacent two sides 23 and 24.

Figure 4:
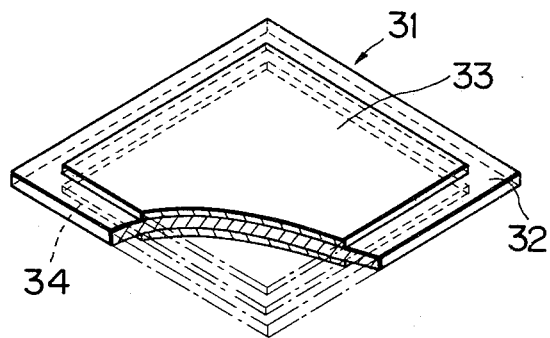
FIG. 4 is a perspective view of a partially broken electrooptical element according to a fourth embodiment of the present invention.

FIG. 4 illustrates an electrooptical element 31 having a film shape according to the fourth embodiment. The electrooptical resin composition 32 formed in a shape of a film has electrodes 33 and 34 on its both surfaces. Further, one or both of the electrodes 33 and 34 may be constructed with a transparent conductive foil such as ITO (indium-tin oxide).

Figure 5:
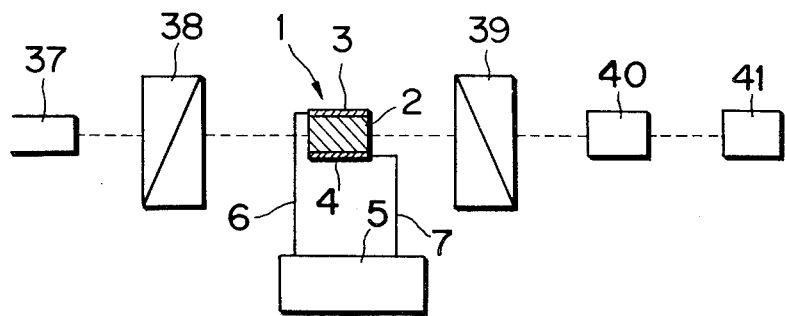
FIG. 5 is a diagrammatic front view of a light intensity modulating apparatus wherein the electrooptical element of the first embodiment is used.

The electrooptical elements 1, 11, 21 and 31 illustrated in FIGS. 1 to 4, are useful as elements for light intensity modulating apparatus and light deflecting apparatus in a same manner as in the case of conventional electrooptical elements. For instance, the electrooptical element 1 of FIG. 1 can be incorporated in a light intensity modulating apparatus as shown in FIG. 5. Namely, the element 1 with the electrodes 3 and 4 connected to the power source 5 via electric wires 6 and 7, is arranged so that its light entering surface is at a right angle to the light path of polarized light sent from a light source 37 passing through a polarizer 38, in order to avoid refraction of the light. Accordingly, the light passed through the electrooptical resin layer 2 passes through an analayzer 39 and is received by a light receiving element 41 disposed therebehind. The quantity of the light photoelectrically converted by the light receiving element 41 is recorded on a recorder 41 as an electric signal. Firstly, light is passed under a condition that no voltage is applied to the element 1, and the polarizer 38 and the analyzer 39 are set to cross at a right angle thereby to minimize the light passing through the analyzer 39. Then, a voltage is applied to the electrodes 3 and 4, and the intensity of the light passing through the analyzer 39 is modulated to become greater as a result of a change in the retardation of the light passing through the element 1.

Thus, in a case where the power source 5 is a direct current power source, the element 1 serves as an element for controlling the intensity of the light. Whereas, in the case of an alternating current power source, a signal wave is obtainable in which the brightness changes corresponding to the cycle of the alternating current.

Further, in the light intensity modulating apparatus of FIG. 5, it is possible to replace the element 1 by the film element 31 of FIG. 4. In such a case, for instance, the electrodes 33 and 34 are made of a transparent material and the element 31 is arranged with an inclination to the light path so that the light passed through one of the electrodes 33 or 34 obliquely passes through the electrooptical resin layer 32 and goes out from the other electrode 34 or 33, whereby, in the same manner as in the above case, the retardation of the light passing through the element 31 changes due to the voltage applied to the electrodes 33 and 34 and the light intensity modulation can thereby be done. If one of the electrodes of the film element 31, for instance, the electrode 34, is made of an opaque material which reflects light, the light entered from the transparent electrode 33, passes through the electrooptical resin layer 32, is reflected by the opaque electrode 34, again passes through the resin layer 32 and goes out from the transparent electrode 33. Accordingly, if the analyzer 39 and the light receiving element 40 are disposed in the light path of the reflected light, the light intensity modulation can be done in the same manner as in the case of the above mentioned transmitted light. In a case where the incoming light is not at a right angle to the film surface as in the case here, there is a tendency that the light undergoes refraction in the film and a light deflection caused by the electrooptical effect occurs. However, with a thin film, the change of the angle is minimal and it is usually possible to carry out substantially only the light intensity modulation.

The electrooptical elements 11 and 21 of FIGS. 2 and 3 can also be used for the light intensity modulation. However, these elements 11 and 21 are particularly suitable for use as a light deflecting element (in certain cases, the element 1 of FIG. 1 is also useful as a light deflecting element.) Their practical applications will be described with respect to the light deflecting apparatus shown in FIGS. 6 and 7, respectively.

Figure 6A:
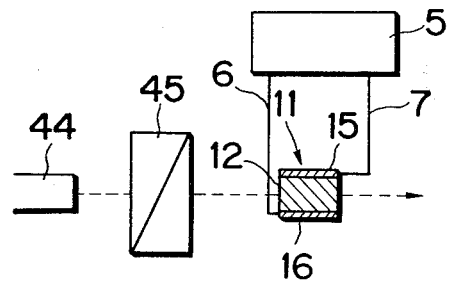
FIG. 6A is a diagrammatic front view of a light deflecting apparatus wherein the electrooptical element of the second embodiment is used.
Figure 6B:
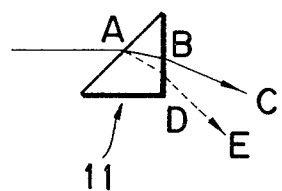
FIG. 6B is a diagrammatic front view of the electrooptical element showing the optical path within the electrooptical element in the apparatus illustrated in FIG. 6A.

Referring to FIG. 6A, the light from a light source 44 is converted to a polarized light by a polarizer 45, then enters from one of the surfaces of the prism shaped element 11 of FIG. 2 on which no electrodes 15 and 16 are provided, obliquely passes through the electrooptical resin layer 12 and goes out from the other surface. The light path is shown in FIG. 6B. In this Fig., the point at which the light enters into the element 11 is designated by A, the outlet of the light where no voltage is applied to the electrodes 15 and 16, is designated by B, and the out-going light is designated by BC. When a voltage is applied between the electrodes 15 and 16, the refractive index of the polarized light changes, and as a result, the light entered from the point A goes out from a point D, as illustrated by a dotted line in the Fig., and becomes a out-going light DE. Namely, the light BC is deflected to become the light DE.

Figure 7A:
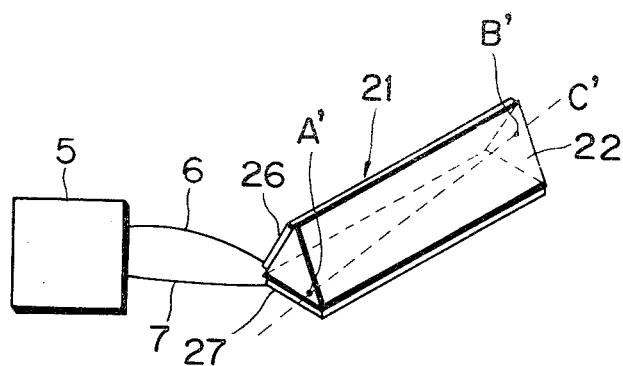
FIG. 7A is a diagrammatic perspective view of a light deflecting apparatus wherein the electrooptical element of the third embodiment is used.
Figure 7B:
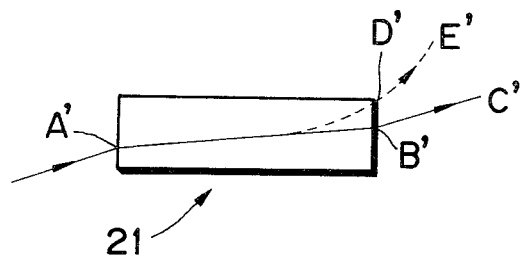
FIG. 7B is a diagrammatic front view of the electrooptical element showing an optical path within the element in the apparatus illustrated in FIG. 7A.

FIG. 7 illustrates a case wherein light passed through a polarizer similar to the one shown in FIG. 6, is passed through the element 21 of FIG. 3 for deflection. Namely, as shown by FIGS. 7A and 7B, light entered from point A' obliquely passes through the element 21 of the triangle pole shape, reaches point B' and goes out as light B'C', when no electric field is applied. In this element 21, the nearer the electrodes 26 and 27 are disposed to one of the apexes of the triangle, the closer they become from each other. Accordingly, when an electric field is applied between these electrodes, as the point A' is relatively far apart from both electrodes 26 and 27, a change in the refractive index of the resin near the point A' due to the electrooptical effect is minimal, and as the electrodes 26 and 27 are closer towards the point B', a change in the refractive index due to the electrooptical effect increases towards the point B'. Accordingly, the light passing through the element 21 is arcuately deflected towards the point where the refractive index is greater, as shown by a dotted line in FIG. 7B as viewed from above the element 21, and the outgoing light is deflected in the direction shown by D'E'.

In the embodiments shown in FIGS. 6 and 7, a triangle flat plate shaped element 11 and a triangle pole shaped element 12 are used, respectively. However, these elements may not necessarily be of a triangle shape, and they may take any other optional polygonal shape.

Now, methods for preparing the electrooptical elements which may be used in the above mentioned light intensity modulating apparatus or light deflecting apparatus will be described.

SYNTHESIS EXAMPLE 1

As a nitro aromatic compound, p-nitroaniline was chosen, and as a polymer substance, polymethylmethacrylate was selected. p-nitroaniline and polymethylmethacrylate were weighted to obtain mixtures having weight ratios of (1) 10:90 and (2) 20:80, respectively. Each mixture was dissolved in acetone, and adequately dispersed and mixed, and the solvent acetone was removed from the liquid thus obtained, with care not to cause foaming, whereupon solid compositions having the weight ratios of p-nitroaniline to polymethylmethacrylate being (1) 10:90 and (2) 20:80, respectively, were obtained. These compositions were transparent yellowish substances.

The solid compositions thus prepared were melt formed, and then optically polished, whereupon electrooptical materials 2 having a rectangular body shape of 5 mm×3 mm×2 mm as shown in FIG. 1 were obtained. Electrodes 3 and 4 were attached, respectively, to opposite surfaces of 5 mm×3 mm of each electrooptical material 2, to obtain a sample 1 for measuring an electrooptical effect. With use of the samples 1 thus obtained, their birefringence was measured by means of the measuring system shown in FIG. 8. In the measuring system shown in FIG. 8, as in the case of FIG. 5, reference numeral 5 designates a direct current power source, numeral 37 designates a He-Ne laser light source, and numerals 38 and 39 designate a polarizer and a analyzer, respectively, which are arranged to cross at a right angle to each other. Reference numeral 42 is a Babinet-Soleil's compensator, and numeral 40 designates a photo-diode. The quantity of the light detected after photoelectrically converted by the photodiode, is recorded on a recorder 41 as an electric signal.

The measurement was conducted in the following manner. Namely, firstly, the light beam entering the sample 1 from the polarizer 38 was led in parallel with the electrodes 3, 4 attached to the electrooptical material 2 of the sample 1, and the Babinet-Soleil's compensator 42 was adjusted to minimize the light entering the photodiode 40. Then, when a direct current voltage was applied to the sample 1, the birefringence of the electrooptical material 2 changed due to the electrooptical effect and as a result, the light entering the photo-diode 40 increased. The Babinet-Soleil's compensator 42 was adjusted to minimize the increased light, and from the reading of the micrometer of the Babinet-Soleil's compensator 42, the change of the birefringence was measured. As the result, it was found that the birefringence of the sample itself was very small and that the change of the birefringence was in proportion to a square of the applied voltage. It was confirmed that the electrooptical effect thereby obtained was a Kerr effect. Then, the Kerr constant was calculated from the double refractive index, and the following results were obtained.

With the composition (1): $7.8 \times 10^{-11}$ cm/V$^2$
With the composition (2): $1.7 \times 10^{-10}$ cm/V$^2$ These values are almost in proportion to the concentrations of p-nitroaniline. Further, these values are very close to the Kerr constant of $3.3 \times 10^{-10}$ cm/V$^2$ of p-nitrobenzene itself.

For the purpose of comparison, a similar measurement was carried out with respect to a sample of polymethylmethacrylate alone which was prepared in exactly the same manner as the above mentioned method except that p-nitroaniline was omitted, whereby it was found that the sample showed no electrooptical effect.

SYNTHESIS EXAMPLE 2

As nitro aromatic compounds, (a) p-nitroaniline, (b) o-nitroaniline, (c) 2-nitro-4-methoxyaniline, (d) p-nitro-o-chloroaniline, (e) 5-nitro-o-toluidine, (f) 2-nitrodiphenylamine, (g) 1,2-diamino-4-nitrobenzene and (h) p-nitrophenol, were chosen, and as a polymer substance, polymethylmethacrylate was selected.

Each of the polar substances (a) to (h) having electrooptical effects and polymethylmethacrylate were weighed in a weight ratio of 10:90. Each mixture thereby obtained was dissolved in acetone in a manner similar to Example 1, whereby a molten liquid mixture was obtained. Each liquid mixture was cast on a glass with transparent metal oxide electrode thereon and the solvent was carefully evaporated, whereupon an optically homogeneous cast film was obtained. Further, a ITO transparent electrode was sputter deposited on the cast film, and electrode lead wires were taken out from the glass with metal oxide electrode side and the sputter-deposited ITO electrode side, to form a sample for measuring the electrooptical effect. The thicknesses of the respective films were (a) 100μ, (b) 230μ, (c) 190μ, (d) 180μ, (e) 250μ, (f) 250μ, (g) 230μ and (h) 200μ.

Figure 8:
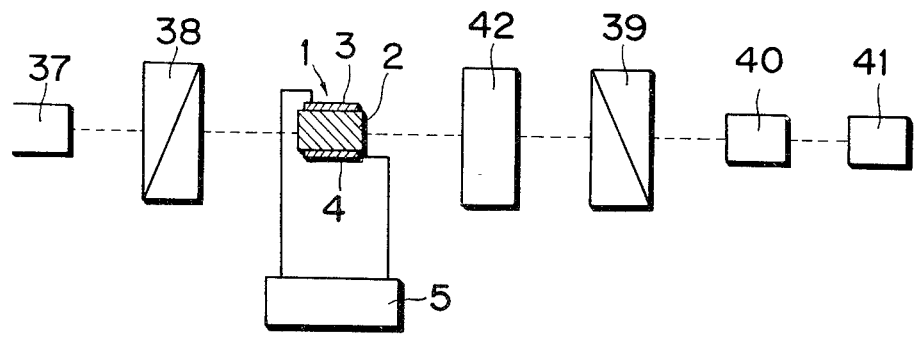
FIG. 8 is a diagrammatic front view of a light intensity modulating apparatus equipped with a Babinet-Soleil's compensator for the measurement of electrooptical effects.

Each of these samples was set in the electrooptical effect measuring system shown in FIG. 8 so that the incoming light beam and a line perpendicular to the surface of the glass with metal oxide electrode are at an angle of 25° from each other, and the electrooptical effect was measured.

It was found that the changes in the birefringence indexes of the films prepared by the above method, against the electric field, were in proportion to a square of the electric field in all cases. From this fact, the electrooptical effect was found to be a Kerr effect. The Kerr constants of the respective films were as follows: (a) p-nitroaniline: $2.7 \times 10^{-12}$ cm/V$^2$, (b) o-nitroaniline: $2 \times 10^{-12}$ cm/V$^2$, (c) 2-nitro-4-methoxyaniline: $2.1 \times 10^{-12}$ cm/V$^2$, (d) p-nitro-o-chloroaniline: $4.0 \times 10^{-12}$ cm/V$^2$, (e) 5-nitro-o-toluidine: $4.4 \times 10^{-12}$ cm/V$^2$, (f) 2-nitro-diphenylamine: $1.1 \times 10^{-12}$ cm/V$^2$, (g) 1,2-diamino-4-nitrobenzene: $4.1 \times 10^{-12}$ cm/V$^2$ and (h) p-nitrophenol: $0.98 \times 10^{-12}$ cm/V$^2$.

SYNTHESIS EXAMPLE 3

As a nitro aromatic compound, p-nitroaniline was chosen, and as a polymer substance, polyvinylacetate was selected. They were weighed in a weight ratio of 10:90. Cast films having thicknesses of 130μ and 310μ were prepared on glass with metal oxide electrode in the same manner as in Synthesis Example 2. The electrooptical effects of these films were measured in the same manner as in Synthesis Example 2, whereupon it was found that their Kerr constants were $8.0 \times 10^{-12}$ cm/V$^2$ and $19 \times 10^{-12}$ cm/V$^2$, respectively.

As described hereinabove, the electrooptical materials having electrooptical effects according to the present invention are optically uniform, and have no birefringence property and they are superior in the forming processability. Thus, they are extremely useful as materials for dynamic optical products.

Having described specific embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electrooptical element exhibiting the Kerr effect which comprises a transparent solid member formed of a resin composition and at least a pair of electrodes on its surfaces, said resin composition comprising a low molecular weight polar substance having a Kerr type electrooptical effect and an organic polymer substance selected from the group consisting of polymethacrylates, polystyrene, polysulfone, polyvinylchloride, polycarbonate, BS resin, ABS resin and MBS resin.

2. The electrooptical element as claimed in claim 1, wherein said low molecular weight polar substance is a nitro aromatic compound.

3. The electrooptical element as claimed in claim 2 wherein said nitro aromatic compound has an electron donative group.

4. The electrooptical element as claimed in claim 1 wherein said organic polymer substance is transparent.

5. The electrooptical element as claimed in claim 1 wherein said organic polymer substance is plasticized and made transparent by said low molecular polar substance.

* * * * *